United States Patent
Kim

(10) Patent No.: US 7,020,556 B2
(45) Date of Patent: Mar. 28, 2006

(54) DEVICE AND METHOD FOR TRAFFIC INFORMATION GUIDING IN NAVIGATION SYSTEM

(75) Inventor: Ki Won Kim, Sungnam-si (KR)

(73) Assignee: LG Electronics INc., Seoul (KR)

( * ) Notice: Subject to any disclaimer, the term of this patent is extended or adjusted under 35 U.S.C. 154(b) by 58 days.

(21) Appl. No.: 10/759,435

(22) Filed: Jan. 20, 2004

(65) Prior Publication Data

US 2004/0148099 A1    Jul. 29, 2004

(30) Foreign Application Priority Data

Jan. 17, 2003    (KR) .................. 10-2003-0003386

(51) Int. Cl.
*G01C 21/26* (2006.01)
*G08G 1/0968* (2006.01)

(52) U.S. Cl. ............. 701/213; 340/995.13; 342/357.09

(58) Field of Classification Search ................ 701/211, 701/213, 117; 342/357.09, 357.1; 340/995.13
See application file for complete search history.

(56) References Cited

U.S. PATENT DOCUMENTS

| | | | | |
|---|---|---|---|---|
| 6,092,020 | A * | 7/2000 | Fastenrath et al. | 701/119 |
| 6,150,961 | A * | 11/2000 | Alewine et al. | 340/995.1 |
| 6,178,374 | B1 * | 1/2001 | Mohlenkamp et al. | 701/117 |
| 6,384,739 | B1 * | 5/2002 | Roberts, Jr. | 340/905 |
| 6,463,382 | B1 * | 10/2002 | Bullock | 701/117 |
| 6,680,694 | B1 * | 1/2004 | Knockeart et al. | 342/357.09 |
| 6,708,107 | B1 * | 3/2004 | Impson et al. | 701/117 |
| 6,711,493 | B1 * | 3/2004 | Andrews et al. | 701/117 |
| 6,882,930 | B1 * | 4/2005 | Trayford et al. | 701/117 |
| 2004/0204845 | A1 * | 10/2004 | Wong | 701/210 |

* cited by examiner

*Primary Examiner*—Michael J. Zanelli
(74) *Attorney, Agent, or Firm*—Birch, Stewart, Kolasch & Birch, LLP

(57) ABSTRACT

There is provided an apparatus and method for guiding a traffic information in a navigation system, in which a user of a moving object directly selects and provides traffic conditions changing on a current traveling road in real time. Additionally, the user can receive the traffic conditions. The method for guiding the traffic information in the navigation system includes the steps of: displaying a traveling route on a screen; determining whether a current mode is a traffic condition input mode while a moving object travels; if the current mode is the traffic condition input mode, displaying a current traffic condition on a screen in order for a selection; checking whether or not the current traffic condition is selected on the displayed screen; and if the traffic condition is selected, transmitting a traffic information message to a traffic information center, the traffic information message including the selected traffic condition, a current position and a current velocity.

15 Claims, 7 Drawing Sheets

(a)

(b)

DEVICE AND METHOD FOR TRAFFIC INFORMATION GUIDING IN NAVIGATION SYSTEM

This Non-provisional application claims priority under 35 U.S.C. § 119(a) on patent application Ser. No(s). 10-2003-0003386 filed in Korea on Jan. 17, 2003, the entire contents of which are hereby incorporated by reference.

BACKGROUND OF THE INVENTION

1. Field of the Invention

The present invention relates to a navigation system, and more particularly, to an apparatus and method for guiding traffic information in a navigation system, in which a traffic information center is directly informed of a variety of variable information generated on a traveling route of a moving object. In addition, the present invention relates to an apparatus and method for guiding traffic information in a navigation system, in which a variety of variable information generated on a traveling route of a moving object is received from a traffic information center.

2. Description of the Related Art

In general, a navigation system displays a current position of a moving object on a map, which is displayed on a screen, by using information received from a global positioning system (hereinafter, referred to as a "GPS").

Additionally, the navigation system provides a driver with a variety of information necessary for a traveling of the moving object, such as a traveling direction of the moving object, a distance to the desired destination, a current movement velocity of the moving object, a route set previously by a driver, an optimum route to the destination, and the like.

The navigation system (or GPS) is installed in various kinds of moving objects, such as vessels, airplanes and automobiles, and is widely used to check a current position and movement velocity of the moving object or to determine a traveling route of the moving object. Specifically, the navigation system receives radio waves indicating latitude, longitude and altitude from a plurality of GPS satellites, performs a calculation operation, and visually or audibly informs the driver of a map information including the current position of the moving object.

FIG. 1 is a construction of a conventional navigation system.

Referring to FIG. 1, a GPS receiver 102 receives predetermined position data through an antenna for the purpose of a navigation service. Here, the position data are transmitted from a plurality of GPS satellites 100. A velocity sensor/gyro sensor 104 constitutes a sensor part and senses a rotational angle and velocity of a moving object.

An input unit 106 is a user interface configured to receive various key signals from a user and set a traveling route.

A map data storage unit 108 stores map data and other additional information data. In General, the map data storage unit 108 is implemented with compact disk-read only memory (CD-ROM).

A control unit 110 controls an overall operation of the navigation system. The control unit 110 determines a current position of the moving object by using a reception signal of the GPS receiver 102 and matches the determined current position with the map data stored in the map data storage unit 108.

In case the user inputs an origin and a destination through the input unit 106, the control unit 110 searches a traveling route from the current position of the moving object to the destination by referring to the map data stored in the map data storage unit 108. The searched traveling route is displayed on an electronic map of a display unit 114 through a display driving unit 112.

Additionally, the traveling route of the moving object can be guided by a guidance voice that is outputted to a speaker 118 through a voice guidance unit 116.

The navigation system receives GPS satellite signals from the plurality of GPS satellites 100 located over the earth and checks the current position and the traveling direction of the moving object to thereby track a traveling trace. Additionally, the navigation system provides the driver with the shortest route among several traveling routes from the origin to the destination.

Meanwhile, the conventional navigation system collects registration information of the moving objects traversing an arbitrary area, analyzes a traffic condition, and provides the analysis result of the traffic condition to the moving object if it is requested. Accordingly, it is possible to cope with the traffic condition of a road where the user intends to travel, thereby providing a smooth traffic flow.

However, although there exist many variables, such as movement and stoppage, which change in real time on the traveling route of the moving object, there has been no method for collecting information on the variables in the traffic information center. Accordingly, there is a problem that cannot provide accurately a service about the causes of the variables.

Since the traffic information service is provided in a state that the variables according to the traveling of the moving object are not applied, the reliability of the service is lowered in the user's place, thereby degrading the convenience and reliability of the product.

In other words, according to the conventional navigation system, it is difficult to guide the traveling route while reflecting the road traffic condition that changes in real time. Additionally, it is difficult to modify a dynamic map data according to changes of the road which is opened newly or under construction.

SUMMARY OF THE INVENTION

Accordingly, the present invention is directed to an apparatus and method for guiding a traffic information in a navigation system that substantially obviates one or more problems due to limitations and disadvantages of the related art.

It is an object of the present invention to provide an apparatus and method for guiding a traffic information in a navigation system, in which information on traffic conditions occurring on a traveling route of a moving object is provided to a traffic information center, such that it is possible to guide the traffic guidance while reflecting the real-time traffic conditions.

It is another object of the present invention to provide an apparatus and method for guiding a traffic information in a navigation system, in which traffic conditions are checked more rapidly by receiving the collected traffic conditions of a traveling route from a traffic information center and it is possible to receive the traffic information that changes on a current traveling route in real time.

It is further another object of the present invention to provide an apparatus and method for guiding a traffic information in a navigation system, in which a user of a moving object selects at least one of a traffic congestion, a traffic delay, a slow speed, a normal speed, a man working and a traffic accident, and an information including the selected traffic condition and a current position and velocity of the moving object is provided to a traffic information center. Further, it is possible to receive the traffic information on an intended traveling route.

Additionally advantages, objects, and features, of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an embodiment of the present invention, an apparatus for guiding a traffic information in a navigation system includes: a GPS receiver for receiving position data from a plurality of GPS satellites; a storage means for storing a map data and a traffic information; a display means for displaying the stored map data and information of a traffic condition on a screen; an input means for inputting a variety of key signals and selecting a traffic condition of a current road on a traveling route; a velocity and direction sensing means for sensing a traveling velocity and direction of a moving object; a wireless communication means, for transmitting and receiving a traffic information including the traffic condition of the traveling road; and a control means for controlling each means, controlling the traffic information of the traveling route to be transmitted to the wireless communication means, and controlling the received traffic information to be displayed.

Preferably, the control means provides respective items of the traffic condition of the road to a screen display means and/or an audio output means if a traffic condition input mode is selected by a user, and allows the user to select an item matched with a current traffic condition.

According to another embodiment of the present invention, a navigation system includes: a navigation terminal mounted on a moving object, for providing a traveling direction to a user in real time and transmitting/receiving traffic information according to current road conditions on a traveling route; a traffic information center for collecting and analyzing traffic information transmitted from a plurality of moving objects and providing traffic information on traveling routes to the corresponding moving objects; and a mobile communication network for transferring the traffic information being transmitted/received between the navigation terminal and the traffic information center.

According to further another embodiment of the present invention, a method for guiding a traffic information in a navigation system includes the steps of: displaying a traveling route on a screen; determining whether a current mode is a traffic condition input mode while a moving object travels; if the current-mode is the traffic condition input mode, displaying a current traffic condition on a screen in order for a selection; checking whether or not the current traffic condition is selected on the displayed screen; and if the traffic condition is selected, transmitting a traffic information message to a traffic information center, the traffic information message including the selected traffic condition, a current position and a current velocity.

Preferably, the method further includes the steps of: if the current mode is not the traffic condition input mode, checking whether or not the traffic condition of the traveling route is requested to the traffic information center; if the traffic condition of the traveling route is requested, receiving the traffic information corresponding to the traveling route from the traffic information center through a mobile communication network; and displaying the received traffic information on a screen.

According to the present invention, the user of the moving object can directly input and transmit the road and traffic conditions and the traveling velocity when the traffic conditions occur and the information can be provided to other users, such that the changes of the road information and traffic information are reflected in real time in case it takes a long time to reach a destination from an origin.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Reference will now be made in detail to a preferred embodiment of the present invention with reference to the attached drawings.

Figure 1:
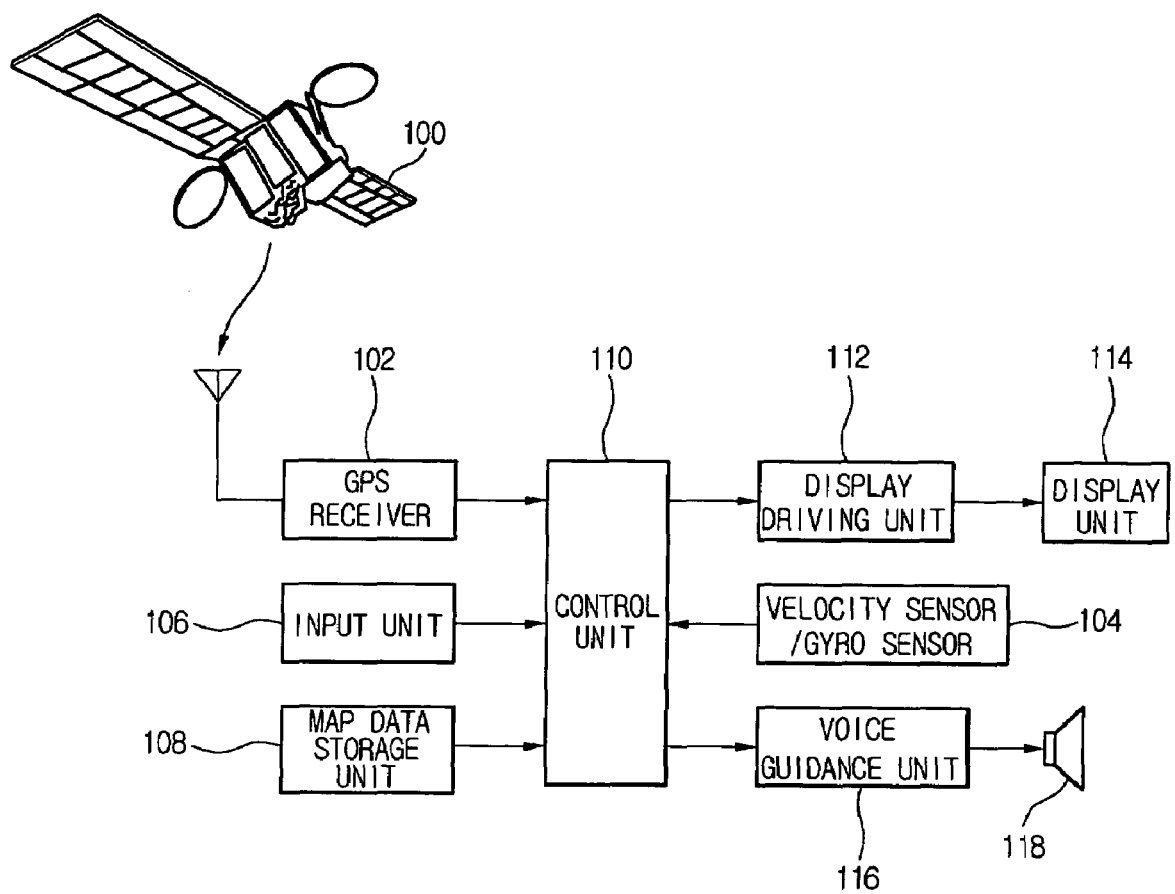
FIG. 1 illustrates a construction of a conventional navigation system.
Figure 2:
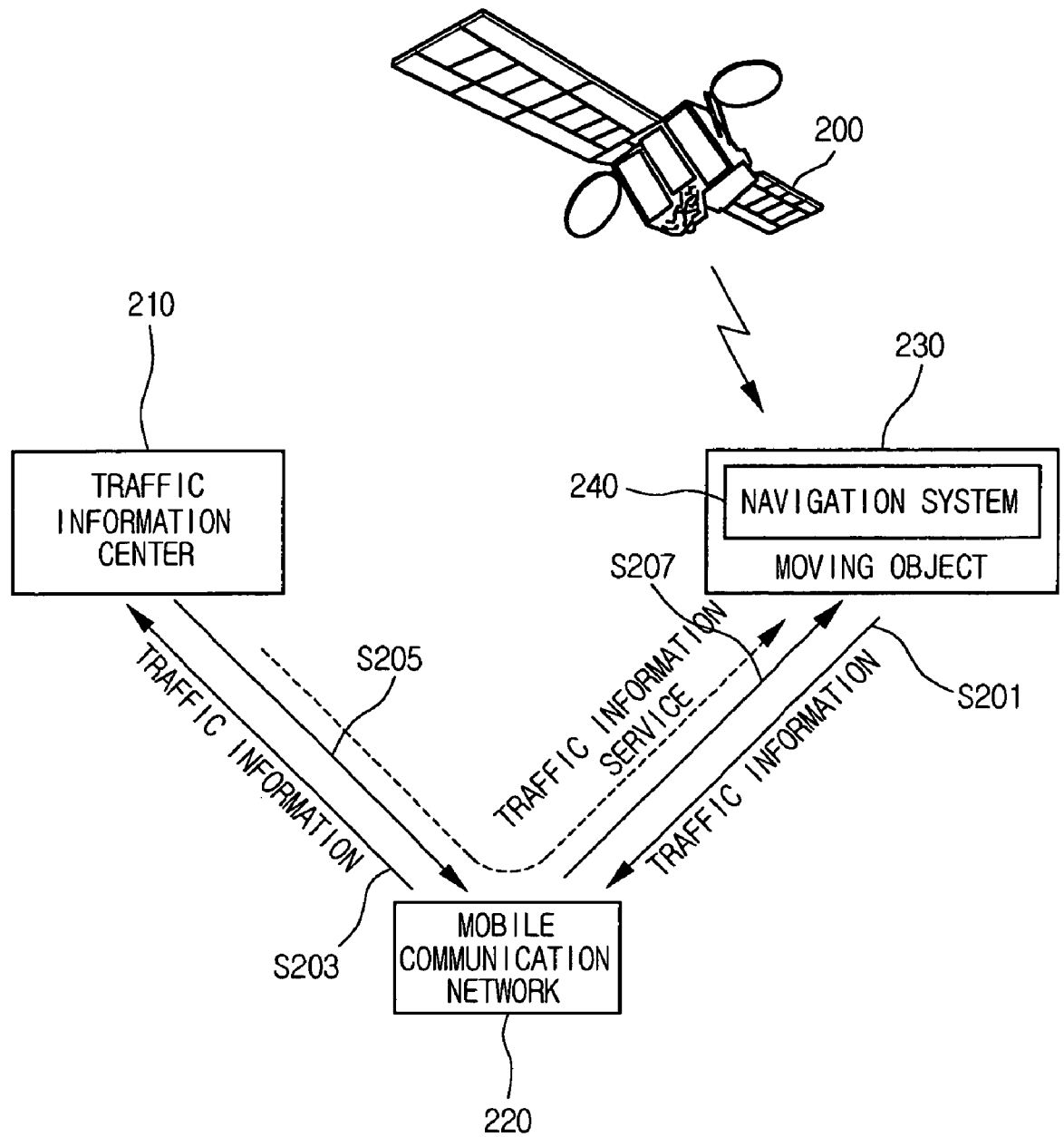
FIG. 2 illustrates a service network of a navigation system according to an embodiment of the present invention.

As shown in FIG. 2, a navigation system according to the present invention includes: a traffic information center 210 for collecting and providing a traffic information; a navigation system 240 installed in a moving object 230 to search a traveling route by using position data received from a plurality of GPS satellites 200 and map data stored in a storage media and to request a traffic information service; and a mobile communication network 220 for enabling a communication between the traffic information center 210 and the navigation system 240.

Herein, an operation of the navigation system constructed as above will be described below.

The navigation system 240 detects a current position of a moving object 230 by using the position data received from the plurality of GPS satellites 200 and signals sensed by a plurality of sensors installed in the moving object 230. The sensors include a gyro sensor for sensing a traveling direction of the moving object and a velocity sensor for sensing a traveling velocity of the moving object.

The navigation system 240 map-matches the detected current position of the moving object with the map data stored in the storage media and searches a traveling route from the current position to the destination by using the map data. Additionally, the navigation system 240 has functions of searching and guiding the optimum route, which allow the moving object to travel to the destination along the searched traveling route.

Further, the navigation system 240 requests service information, such as real-time traffic information, route guidance information and telephone connection, to the traffic information center 210 through the mobile communication network 220 (S201, S202). Additionally, the navigation system 240 receives traffic information service from the traffic information center 210 through the mobile communication network 220 (S203, S204)

Figure 3:
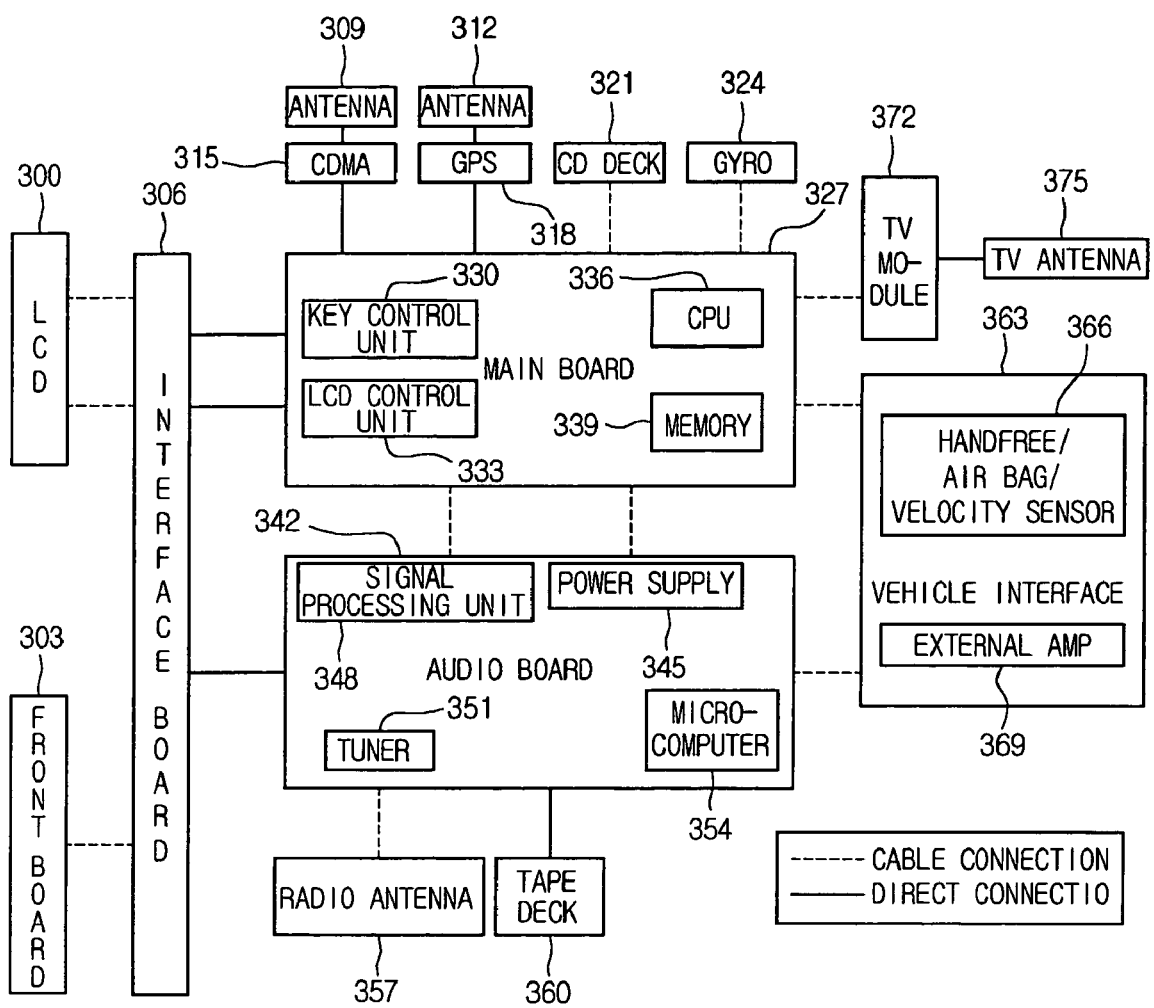
FIG. 3 illustrates a detailed construction of a navigation system according to an embodiment of the present invention.

FIG. 3 is a block diagram of the navigation system according to the present invention.

Referring to FIG. 3, the navigation system includes an interface board 306, a main board 327, an audio board 342 for processing an audio signal, and a vehicle interface 363.

The interface board 306 is connected between the main board 327 and the audio board 342 and between an LCD 300 and a front board 303 and performs an interface function therebetween.

The main board 327 includes a central processing unit (CPU) 336 for controlling the system, a memory 339 provided for storing the map information necessary to display the information and the traveling route guidance on a map according to the current traffic condition of a road where the moving object travels; a key control unit 330 for controlling a key signal; and an LCD control unit 333 for controlling an LCD.

The main board 327 is connected via cable or directly to a CDMA communication unit 315, a GPS receiver 218 for receiving GPS signal, a CD deck 321 for playing and recoding disk (CD, DVD, etc.) signal, and a gyro 324. Here, the CDMA communication unit 315 is a mobile communication terminal having an equipment identification number. The CDMA communication unit 315 and the GPS receiver 318 receive signals through antennas 309 and 312, respectively.

Additionally, a TV module 372 is connected to the main board 327 to receive TV signals through a TV antenna 275. The LCD 300 and the front board 303 are connected to the main board through the interface board 306. The LCD 300 and the front board 303 are controlled by the LCD control unit 333 and the key control unit 330, respectively.

The LCD 300 functions to display a variety of video and character signals. The front board 303 includes various buttons and provides a corresponding key signal of a selected button to the main board. The front board 303 includes a menu key or button for directly inputting the traffic information according to an embodiment of the present invention.

The audio board 342 interfaces with the main board 327 and includes a microcomputer 354, a tuner 351 for receiving a radio signal, a power supply 345, and a signal processing unit 348 for performing a signal process to output a variety of audio signals.

Additionally, a radio antenna 357 for receiving the radio signal, a tape deck 360 for playing an audio tape, and an amp 369 for outputting the processed audio signal are connected to the audio board 342. The audio board 342 is connected to the interface board 306.

The vehicle interface 363 is an interface means for transmitting/receiving signals to/from the amp 369 and hand-free/air bag/velocity sensor 366, which are mounted on the moving object, and transmits/receives signals to/from the audio board 342 and the main board 327. The velocity sensor for sensing the velocity of the moving object, the air bag for securing a safety, and the hand-free 366 for inputting an audio signal without using the driver's own hands are connected to the vehicle interface 363. The velocity sensor provides the velocity information to the central processing unit 326 in order to sense the velocity of the moving object.

The navigation system 240 is a combination system that can provide a variety of wireless data service, a mobile communication and broadcasting reception by connecting it to a variety of audio and video devices and adding a telematics function, in addition to the navigation service of the moving object.

Here, for the purpose of the mobile communication service, the CDMA communication unit 315 transmits/receives signals to/from the mobile communication network through the antenna 309 by wireless. The received signal is transmitted to the audio board 342 under a control of the central processing unit 327, and then processed through the signal processing unit 348 of the audio board 342. Then, the processed signal is outputted through the amp 269 under a control of the microcomputer 354.

The TV signal received through the TV antenna 375 for the purpose of the TV broadcasting is processed through the TV module 372. Then, the processed TV reception signal is displayed in a form of a video signal on the LCD 300 through the interface board 306 under a control of the LCD control unit 333. Additionally, the audio signal of the TV reception signal is outputted through the audio board 342 and the amp 269.

An audio signal of the radio signal received through the tuner 351 for the purpose of the radio broadcasting and an audio signal of the audio tape received through the tape deck 360 are outputted through the audio board 342 and the amp 369. The audio signal played through the deck 321 is also outputted through the amp 369, and a variety of the video signals are displayed on the display unit, i.e., the LCD 200.

In this embodiment, it is possible to directly input or select the traffic information by using the navigation system. Here, the traffic information includes a variety of variable information, such as traffic congestion, traffic delay, slow speed, traffic accident, man working, and the like, which occur on the road where the moving object travels. Further, the selected traffic information, the velocity and current position of the moving object can be transmitted together to the traffic information center over the transfer message.

Herein, a method for guiding the traffic information according to an embodiment of the present invention will be described with reference to FIGS. 3 and 4.

Figure 4:
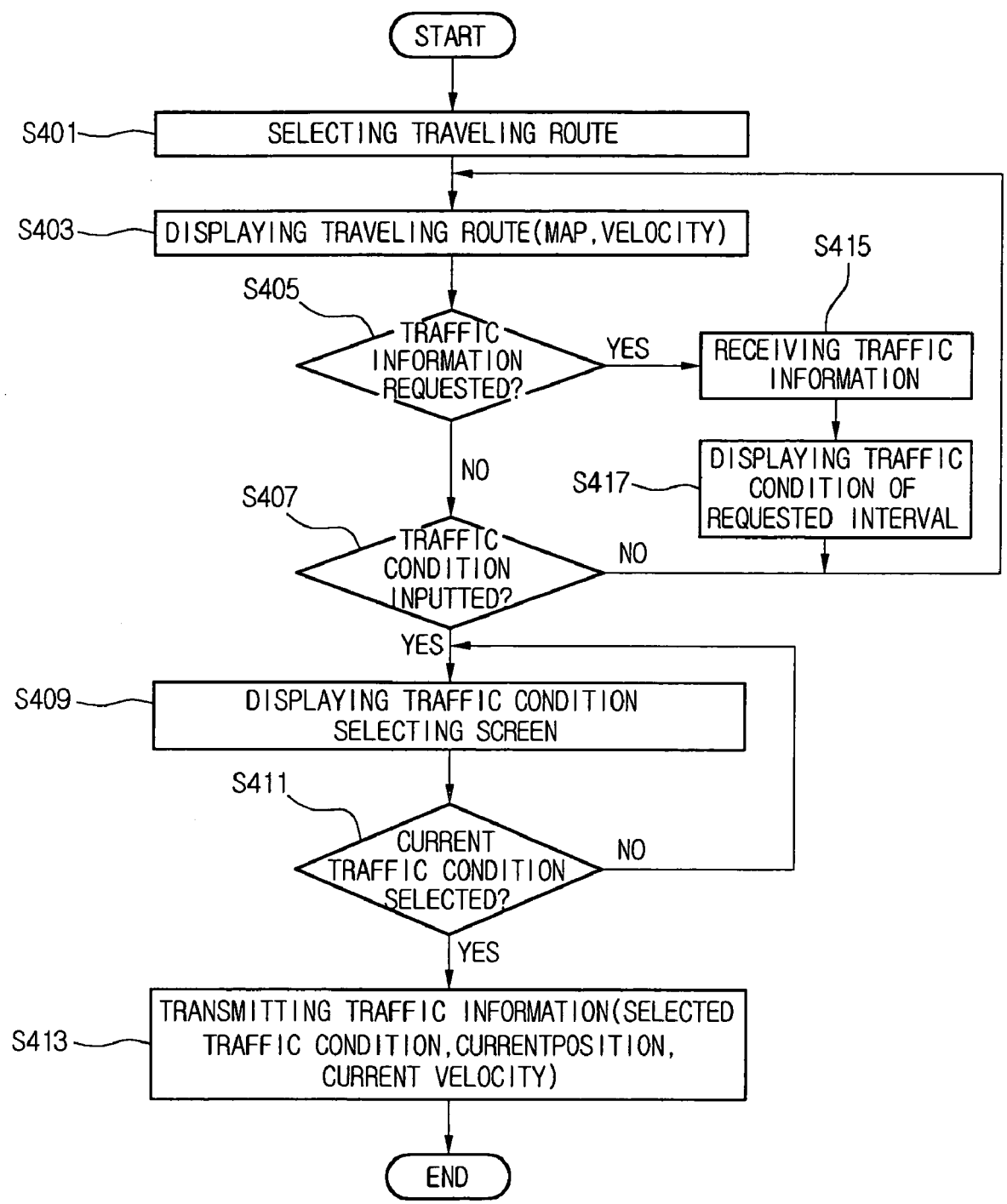
FIG. 4 is a flowchart illustrating a method for guiding a traffic information in a navigation system according to an embodiment of the present invention.

Referring to FIGS. 3 and 4, the user selects the menu through the menu key provided at the front board 303 and inputs an origin and a destination, which correspond to the traveling route. The inputted signal is transmitted to the central processing unit 336 through the key control unit 330 of the main board 327 connected to the interface board 306. Then, the traveling route is requested (S401).

The central processing unit 326 controls the respective units in order for the traveling route guidance. At this time, the LCD control unit 333 reads out the traveling route from the memory 339 and displays it on the LCD 300 through the interface board 306 (S403).

Additionally, the central processing unit 336 checks whether or not the traffic information of the traveling route is requested (S405). If the traffic information of the traveling route is requested, the traffic information is requested to the traffic information center through the CDMA communication unit 315 and the requested traffic information is then received from the traffic information center (S415). The received traffic information is displayed on a corresponding location of the traveling route, which is displayed on the LCD 300 (S417).

If the user requests an audio traffic information, the traffic information including an audio signal is received from the traffic information center. At this time, the central processing unit 336 outputs the received traffic information to the audio board 342, and the audio board 342 processes the received traffic information into the audio signal through the signal processing unit 348. Then, the audio signal is externally outputted through the amp 369 according to the control of the microcomputer 354. Accordingly, the user can hear the traffic information in the audio form.

Meanwhile, it is possible to input and transmit the current traffic conditions of the road, where the user travels, as the route guidance information. The user can input these traffic conditions of the road by himself or herself or in case there is an external request for the traffic conditions.

For this, the central processing unit 336 checks whether a current mode is a traffic condition input mode (S407). If the current mode is the traffic condition input mode, a preset traffic condition selecting screen is displayed on the LCD 300 (S409). Here, in the traffic condition input mode, the traffic condition selecting screen is displayed automatically if the user selects a predetermined key provided on the menu.

Here, the traffic condition selecting screen can provide the user with subdivided contents of the traffic condition of the road, where the moving object travels, and road condition (hereinafter, referred to as "traffic conditions"). For example, the subdivided contents may include traffic congestion, traffic delay, slow speed, normal speed, traffic accident, man working, and the like, and the selection of at least one content can be requested.

At this time, if the user selects a specific traffic condition after checking the selection of the traffic conditions (S411), the traffic information including the traffic conditions, the current position and velocity of the moving object is transmitted to the traffic information center through the mobile communication network (S413).

If the traffic information, including the traffic condition (for example, collision of moving objects) and the current position and velocity of the moving object, is created in a form of the transfer message and then transmitted to the CDMA communication unit 315, the transfer message is transmitted to the traffic information center through the mobile communication network.

Figure 5:
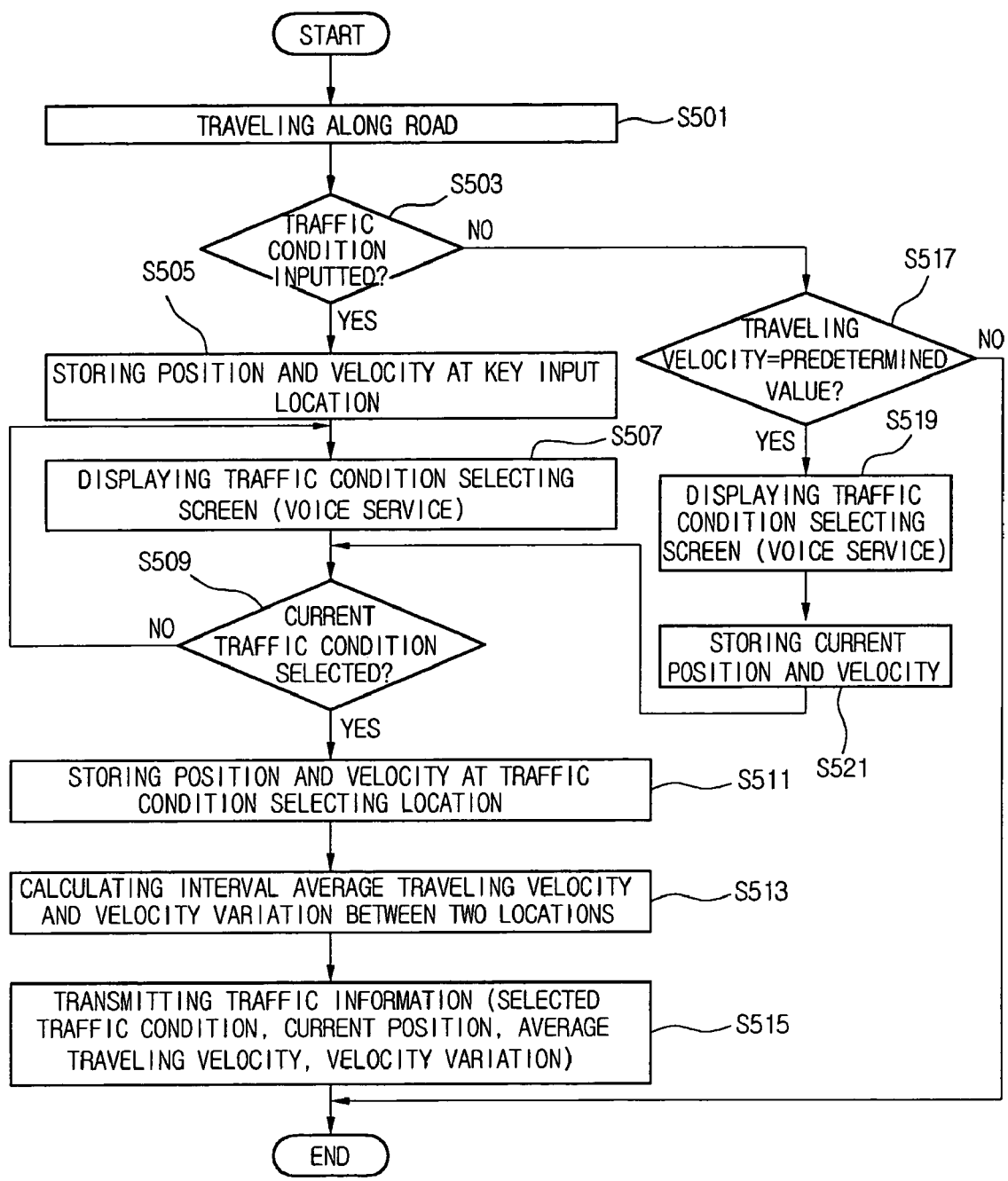
FIG. 5 is a flowchart illustrating a method for guiding a traffic information in a navigation system according to another embodiment of the present invention.

A method for selecting and transmitting the traffic conditions will be described below in detail with reference to FIG. 5.

In case the moving object runs along the traveling route (S501), it is checked whether the key input signal inputted by the user is the traffic condition input mode (S503).

Figure 6:
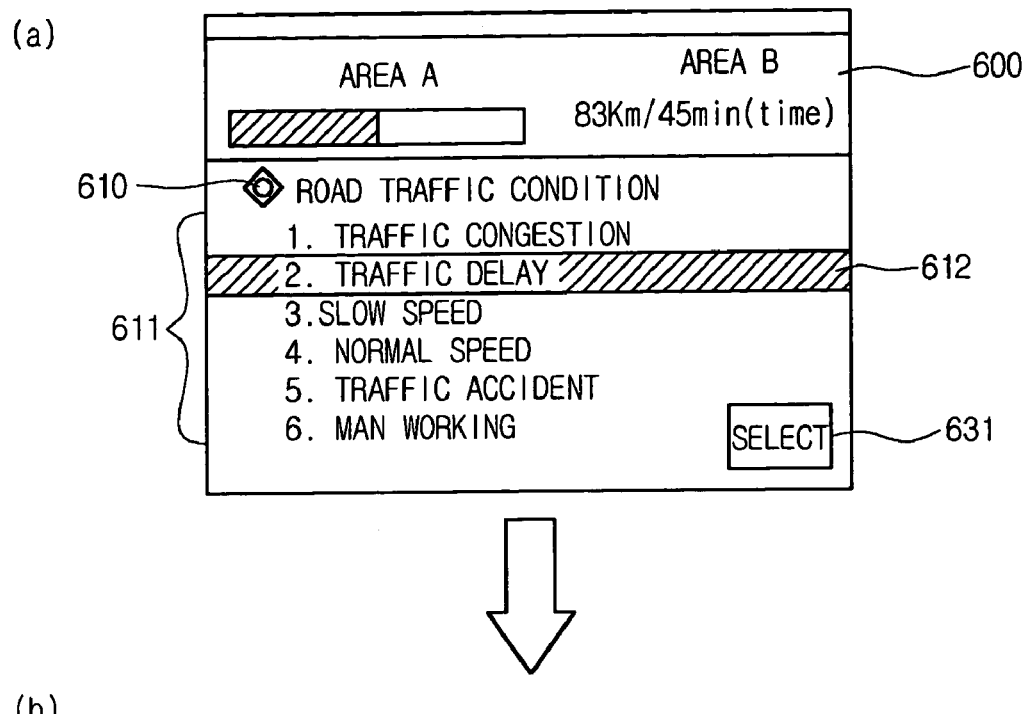
FIG. 6 illustrates a screen for selecting a traffic condition and transmitting the selected information according to an embodiment of the present invention.
Figure 6:
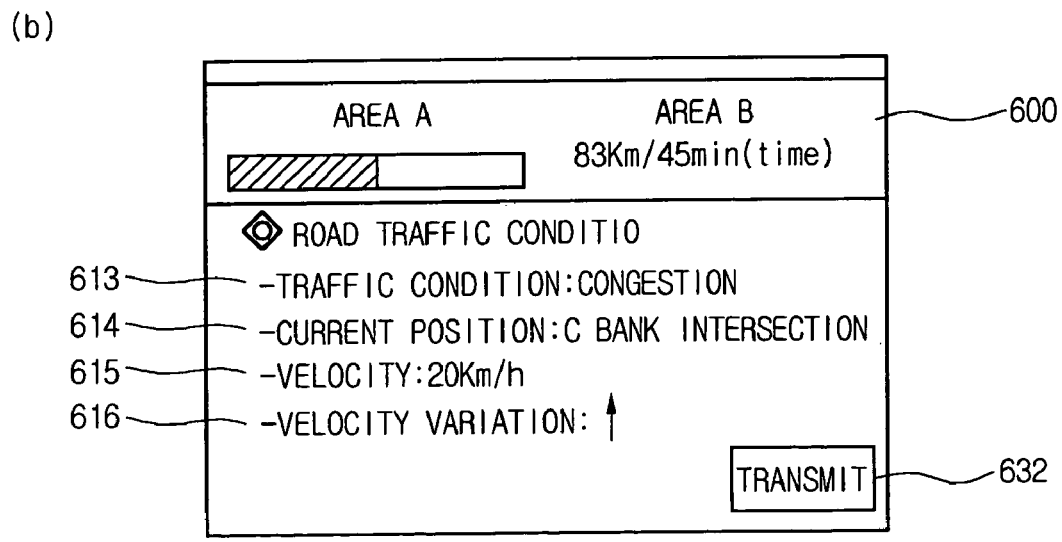

If the key input signal is the traffic condition input mode, the position and velocity of the moving object at the key input location are calculated and stored (S505), and then the traffic condition selecting screen is displayed as shown in FIG. 6(*a*) (S507). At the step S505, in case the user enters the traffic condition input mode or after the traffic condition selecting screen is displayed, the position and velocity of the moving object at the corresponding location can be calculated and stored.

Additionally, at the step S507, the traffic condition selecting screen can be displayed on the screen or can be provided to the user in the form of the audio information. Further, in case the input screen is provided in a form of a touch panel, the corresponding information can be simply inputted by touching it.

As shown in FIG. 6(*a*), the traffic condition selecting screen includes a traveling information display portion 600, a traffic condition selecting portion 610, selection items 611, and a selection key 631 for selecting a specific content.

In other words, an origin (area A) and a destination (area B) are displayed on the traveling information display portion 600. Additionally, the traveling distance information till now is provided in a form of, for example, a bar graph in comparison with a total traveling distance, and a total traveling distance/a total traveling time are displayed on the traveling information display portion 600. Further, the traffic condition selecting portion 610 and the selection items 611 are provided.

Here, the selection items 611 includes traffic congestion, traffic delay, slow speed and normal speed according to the velocity of the moving object, and also traffic accident and man working. At least one of the selection items 611 is selected through the selection key 631. In other words, in case the traffic congestion and delay are repeated, both of them can be selected. In case the traffic congestion happens due to the traffic accident, both the traffic accident and the traffic congestion can be selected.

Meanwhile, after the traffic condition screen is displayed at the step S507, it is checked whether or not the current traffic condition is selected by the user (S509). At this time, if the user selects the current traffic condition or the traffic condition matching with the road condition, the position and velocity of the moving object at the corresponding location are stored (S511).

An interval average velocity between the traffic condition input location and the traffic condition selecting location and a velocity variation ($V\uparrow$, $V\downarrow$) representing an increase/decrease of the traveling velocity are calculated (S513). Here, the average traveling velocity can be calculated using the position difference between two locations and the velocity at two locations.

Here, the average traveling velocity is an average velocity between the traffic condition key input location and the traffic condition selecting location. For example, the average traveling velocity may be an average velocity accumulated in real time from a key input time to a traffic condition selecting time, or may be a traveling velocity at a time when the message is transmitted. Also, the average traveling velocity can be calculated using the traveling time as a period.

The calculated average traveling velocity, the velocity variation, the current position and the traffic information consisting of the selected traffic condition are displayed as shown in FIG. 6(*b*).

Meanwhile, in case the "traffic delay" item among the traffic conditions is selected through the selection key 611 in FIG. 6(*a*), the transfer message of the corresponding traffic information is displayed as shown in FIG. 6(*b*). In other words, the transfer message is displayed as follow: the traffic condition 613: the traffic delay, the current position 614: a C bank intersection, the traveling velocity 615: 20 Km/h, and the velocity variation 616: $\uparrow$. Here, the current position can be represented with an interval between two locations.

Figure 7:
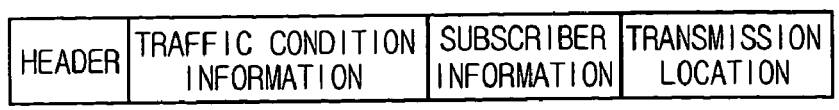
FIG. 7 is an exemplary view of a traffic information transfer message according to an embodiment of the present invention.

If the user selects a transmission key 632, the transfer message including the above traffic information is transmitted to the traffic information center in a transmission format shown in FIG. 7. As shown in FIG. 7, the traffic information transfer message is a short message service (SMS) message and includes a header information, a traffic condition information, a subscriber information (terminal number), and a transmission location. At this time, the reliability of the information can be secured by transmitting the information belonging to the traffic condition information.

Additionally, it is checked whether or not the traveling velocity is less than a predetermined value (S517). If the traveling velocity is less than the predetermined value, the traffic condition selecting screen is displayed automatically and the audio is also provided (S519). At this time, the current position and velocity of the moving object are stored (S521). Then, the process proceeds to the step S509 of checking whether or not the current traffic condition is selected.

In this manner, if the above traffic information is transmitted from the navigation system mounted on the moving object, the traffic information center receives and collects a variety of variables information corresponding to the traffic conditions, which may occur on the road, from the navigation system. Then, the collected information is processed and provided to the moving object which is traveling along the current road or provided when there is the request for the road traffic information.

The traffic information center collects and analyzes the information on the variables and provides the collected information to the moving object which requests the traffic information of the desired destination.

Additionally, in case the navigation system requests the traffic information on the optimum traveling route, the traffic information center can inform the user of the variable information of the traveling route based on the traffic information and can guide the user to the optimum traveling route where the variables do not occur.

Here, the navigation system transmits/receives the traffic information to/from the mobile communication network by wireless communication or wireless Internet. For example, the mobile communication network and the navigation system transmit the transmitted/received message over the short message service (SMS).

Figure 8:
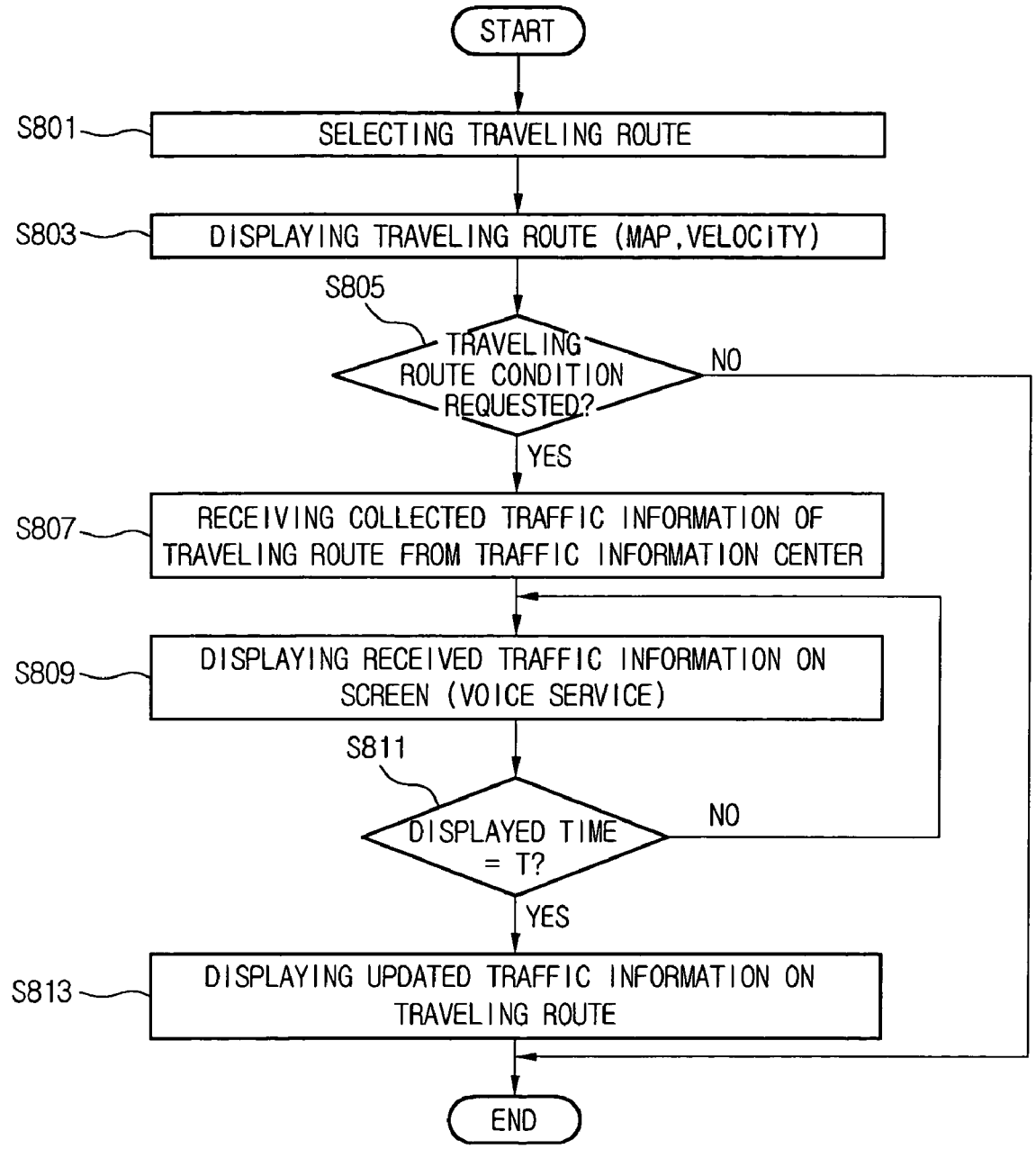
FIG. 8 is a flowchart illustrating a method for guiding a traffic information in a navigation system according to an embodiment of the present invention.

FIG. 8 is a flowchart illustrating a method for providing the traffic information collected in the traffic information center.

First, in case the traveling route is selected (S801), the shortest traveling route connecting the origin and the destination is displayed on the electronic map together with the velocity (S803). At this time, it is checked whether or not the traffic condition of the traveling route is requested. If the traffic condition is requested, the traffic information of the traveling route collected in the traffic information center is received (S805).

At this time, the traffic information received from the traffic information center is the information that is provided from the navigation system mounted on the moving object traveling along the road. The traffic information includes the traffic congestion, the traffic delay, the slow speed, the normal speed, the man working, the traffic accident, the position and velocity at the corresponding location, and the like.

The navigation system displays the received traffic information on the screen. For example, the traffic information of a specific interval can be overlapped on the screen, as shown in FIG. 6(b) (S809). Further, the displayed information can be provided in an audio form. Here, the information is processed into the audio signal in the traffic information center. The user's request of the information can be divided into an audio form or a text form.

Here, the incoming traffic information includes an arbitrary position at the traveling route, the road traffic condition selected on the traveling route by other user, the current velocity on the traveling route, and the like.

Then, it is checked whether or not the displayed time of the received traffic information is a preset time T (S811). If so, the traffic information screen disappears and the updated traffic condition of the traveling route is displayed on the electronic map (S813). Accordingly, the driver can more actively cope with the optimum traveling route displayed on the map. Further, the user can take or request another optimum traveling route in real time.

According to the apparatus and method of the present invention, the navigation system has the road traffic condition input mode, directly informs the traffic information center of the traffic conditions of the current position, and provides the drivers, who requests the optimum route, with the optimum traveling route in which the traffic conditions are reflected. Accordingly, it is possible to rapidly recognize the causes of the variables existing on the traveling route and to actively cope with the selection of the traveling route to the destination.

It will be apparent to those skilled in the art that various modifications and variations can be made in the present invention. Thus, it is intended that the present invention covers the modifications and variations of this invention provided they come within the scope of the appended claims and their equivalents.

As described above, the navigation system allows the driver to select the traffic conditions, which may occur on the traveling route, and to inform the traffic information center of the selected traffic condition information together with the velocity and position of the moving object, such that the respective navigation systems can be used as an information collecting means.

Additionally, it is possible to collect the road traffic condition changing in real time and to provide the respective road traffic conditions to many users, who request the information, more accurately in real time. Further, the service of the optimum traveling route is possible.

Furthermore, since the information on the causes of the road congestion is provided, the traffic information center and other users can check the causes of the traffic congestion in real time and can cope with the traffic conditions rapidly and actively. Accordingly, it is possible to travel to the desired destination more rapidly and to obtain the performance improvement of the product and a synergy effect of the satisfaction with the product.

What is claimed is:

1. An apparatus for guiding a traffic information in a navigation system, comprising:
    a GPS receiver for receiving position data from a plurality of GPS satellites;
    a storage means for storing a map data and a traffic information;
    a display means for displaying the stored map data and information of a traffic condition on a screen;
    an input means for inputting a variety of key signals and selecting a traffic condition of a current road on a traveling route;
    a velocity and direction sensing means for sensing a traveling velocity and direction of a moving object;
    a wireless communication means for transmitting and receiving a traffic information including the traffic condition of the road; and
    a control means for controlling each means, controlling the traffic information of the traveling route to be transmitted to the wireless communication means, and controlling the received traffic information to be displayed.

2. The apparatus according to claim 1, wherein the control means provides respective items of the traffic condition of the road to at least one of a screen display means and an audio output means if a traffic condition input mode is selected by a user, and allows the user to select an item matched with a current traffic condition.

3. The apparatus according to claim 1, wherein the control means enables the display means to display the traffic condition of the road, which occurs on the traveling route, so as to allow the user to select at least one item of the traffic condition, the traffic condition including a traffic congestion, a traffic delay, a slow speed, a normal speed, a traffic accident, a man working.

4. The apparatus according to claim 1, wherein the traffic information received through the wireless communication means includes a current position, a road traffic condition selected on the traveling route by the user, and a current traveling velocity.

5. The apparatus according to claim 1, wherein the traffic information received through the wireless communication means includes a specific interval of a traveling route requested by the user, a road traffic condition selected and provided by other user at the corresponding interval, and a current traveling velocity at the corresponding road.

6. The apparatus according to claim 1, wherein the traffic information includes a current position of the moving object, a traffic condition of a road where the moving object is placed, an average traveling velocity of the moving object according to intervals, and a velocity variation at an interval where the moving object travels.

7. A method for guiding a traffic information in a navigation system, comprising the steps of:
   displaying a traveling route on a screen;
   determining whether a current mode is a traffic condition input mode while a moving object travels;
   if the current mode is the traffic condition input mode, displaying a current traffic condition on a screen in order for a selection;
   checking whether or not the current traffic condition is selected on the displayed screen; and
   if the traffic condition is selected, transmitting a traffic information message to a traffic information center, the traffic information message including the selected traffic condition, a current position and a current velocity.

8. The method according to claim 7, wherein the traffic condition input mode includes one of a direct input mode and an indirect input mode, the direct input mode being a mode that a user of a moving object directly selects the traffic condition from a menu, the indirect input mode being a mode that a traffic condition selecting screen is displayed on a screen if a velocity at a traveling road is less than a predetermined velocity.

9. The method according to claim 7, wherein items of the traffic condition are displayed on the screen or provided in a form of an audio information in order for the user of the moving object to select a traffic condition of a current road, the items including a traffic congestion, a traffic delay, a slow speed, a normal speed, a traffic accident, and a man working.

10. The method according to claim 7, wherein the traffic condition selected by the user of the moving object is at least one of items including a traffic congestion, a traffic delay, a slow speed, a normal speed, a traffic accident, and a man working.

11. The method according to claim 7, wherein the current velocity of the moving object is an average traveling velocity calculated by using a position and velocity at the inputted traffic condition and a position and velocity at the selected traffic condition.

12. The method according to claim 7, wherein the traffic information further includes a velocity variation information representing an increase/decrease of the traveling velocity by using a velocity difference between the inputted traffic condition and the selected traffic condition.

13. The method according to claim 7, further comprising the steps of:
   if the current mode is not the traffic condition input mode, checking whether or not the traffic condition of the traveling route is requested to the traffic information center;
   if the traffic condition of the traveling route is requested, receiving the traffic information corresponding to the traveling route from the traffic information center through a mobile communication network; and
   displaying the received traffic information on a screen.

14. The method according to claim 13, further comprising the step of displaying an updated traffic condition of the traveling route after the received traffic information is displayed on the screen for a predetermined time.

15. The method according to claim 7, wherein the traffic information message includes a header information, a traffic condition information and a current transmission location and is transmitted/received over a short message service (SMS).

* * * * *